(12) United States Patent
Hussain (10) Patent No.: US 10,459,501 B2
(45) Date of Patent: Oct. 29, 2019

(54) SYSTEM AND METHOD FOR AUGMENTATION OF RESET RECOVERY OPERATION TIMING

(71) Applicant: Western Digital Technologies, Inc., San Jose, CA (US)

(72) Inventor: Atif Hussain, Longmont, CO (US)

(73) Assignee: WESTERN DIGITAL TECHNOLOGIES, Inc., San Jose, CA (US)

(*) Notice: Subject to any disclaimer, the term of this patent is extended or adjusted under 35 U.S.C. 154(b) by 0 days.

(21) Appl. No.: 16/047,958

(22) Filed: Jul. 27, 2018

(65) Prior Publication Data

US 2019/0033936 A1    Jan. 31, 2019

Related U.S. Application Data

(60) Provisional application No. 62/538,472, filed on Jul. 28, 2017.

(51) Int. Cl.
*G06F 1/24* (2006.01)
*G06F 1/12* (2006.01)
*G06F 11/14* (2006.01)
*G06F 11/16* (2006.01)

(52) U.S. Cl.
CPC ............... *G06F 1/24* (2013.01); *G06F 1/12* (2013.01); *G06F 11/1438* (2013.01); *G06F 11/1441* (2013.01); *G06F 11/1687* (2013.01)

(58) Field of Classification Search
CPC . G06F 1/324; G06F 1/12; G06F 13/36; G06F 1/10; G06F 1/04; G06F 1/06; G06F 1/28; G06F 1/08; G06F 1/14; G06F 1/24
USPC .......................................... 327/142, 143, 198
See application file for complete search history.

(56) References Cited

U.S. PATENT DOCUMENTS 6,943,590 B2 * 9/2005 Kitahara .................. G06F 1/04
327/18

* cited by examiner

*Primary Examiner* — John W Poos
(74) *Attorney, Agent, or Firm* — Patterson & Sheridan, LLP; Steven H. Versteeg (57) ABSTRACT

A method and apparatus for performing operations of an electrical device, whereby the apparatus performs operations during operation of a clock producing a clock signal, asserts a reset of components performing operations for the electrical device, stops the clock through a reset generation block for a number N cycles and performs the reset of operations during the stopping of the clock through the reset generation block for the number N cycles.

29 Claims, 7 Drawing Sheets

SYSTEM AND METHOD FOR AUGMENTATION OF RESET RECOVERY OPERATION TIMING

CROSS-REFERENCE TO RELATED APPLICATIONS

The current application claims priority to U.S. Provisional Application 62/538,472, dated Jul. 28, 2017, the entirety of which is incorporated by reference.

BACKGROUND OF THE DISCLOSURE

Field of the Disclosure

Aspects of the disclosure relate to reset conditions for electrical apparatus. More specifically, aspects relate to electrical designs and methods that allow relaxation of a reset recovery and for removal of timing paths for resets at fast clock speeds.

Description of the Related Art

Performing resets of electrical components can be a complicated process that must be designed by system architects. In memory systems, differing configurations can lead to complicated electrical arrangements to perform required operations. Such memory systems often use "latch" type arrangements which include differing flip-flop electrical arrangements.

Figure 1:
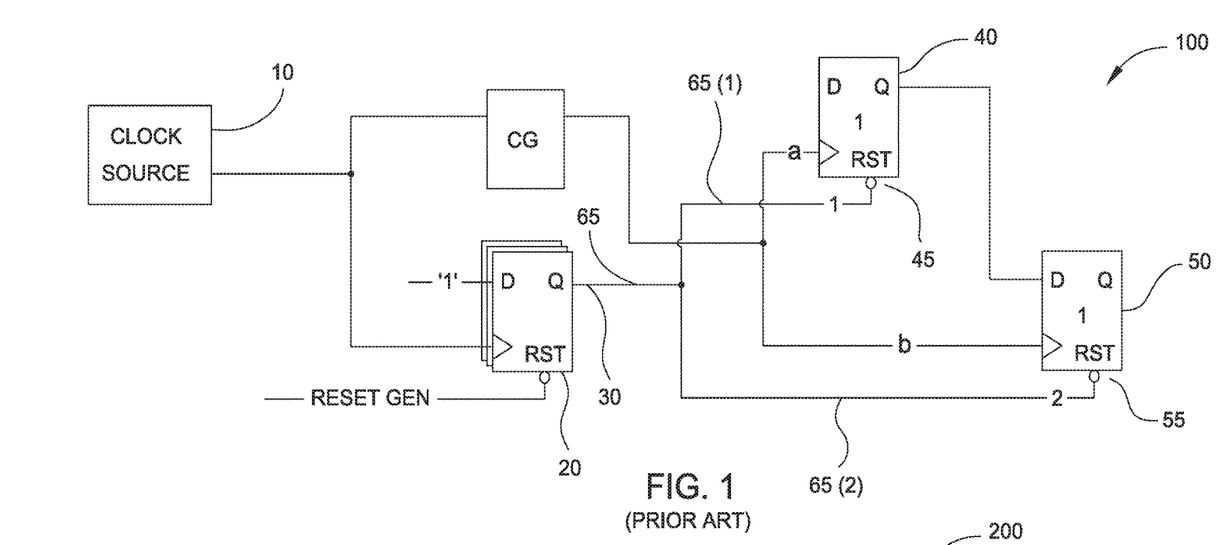
FIG. 1 is a diagram of a conventional clock and reset relationship between a reset generator and two flip-flop components.

FIG. 1 provides a typical reset arrangement 100 for a conventional electrical apparatus that illustrates a relationship between a reset generator 20 to two (2) flip-flops 40, 50. A clock source 10 is connected to the reset generator 20. The output Q 30 of reset generator 20 is connected to the reset point 45 of flip-flop 40 and reset point 55 of flip-flop 50. With this configuration, a reset command placed at the reset generator 20 travels along pathway 65 and then splits into branches 65(1) and 65(2). The distance along pathway 65(1) is different than pathway 65(2), therefore electrical signals sent from the reset generator 20 to each of flip-flop 40 and flip-flop 50 will arrive at the reset points 45, 55 at different times.

Reset operations should be accomplished during a single cycle for the computer system to have proper and predictable operational parameters after the single cycle has ended. The example configuration provided in FIG. 1 illustrates that the different positions of flip-flops 40, 50 cause signals to be received at different times. It can thus be a challenge, therefore, to have the signals received and acted upon within one clock cycle. The problem becomes more manifest the larger the number of flip-flops that are to be reset from the same reset generator.

For many systems, the computer architecture is built onto a single chip and are often called a system on chip ("SOC") architecture. For SOC systems, the number of flip-flops may easily exceed over 60,000 units. As can be appreciated, large numbers of flip-flop units can greatly increase the overall complexity and potential error from a simple reset. Computer architectures may also be configured to link several different chips together, such that the number of flip-flop units can greatly increase over the previously stated amounts, causing further difficulty during operations.

Figure 2:
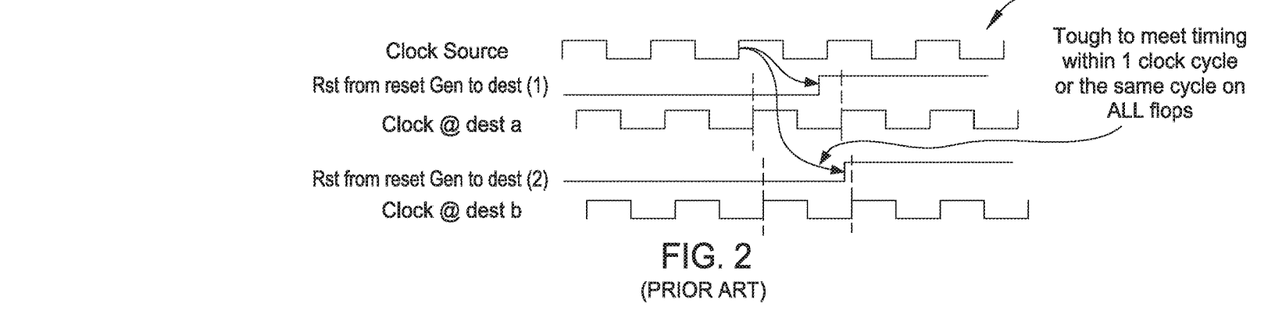
FIG. 2 is a diagram of a conventional reset de-assertion reaching a first destination and a second destination at different times.

Referring to FIG. 2, a graph 200 of a conventional hypothetical clock source is illustrated for the embodiment provided in FIG. 1. The amount of time that is required from the activation of the reset generator to destination 1, flip-flop 40 is noted in the second level. The amount of time that is required from the activation of the reset generator to destination 2, flip-flop 50 is noted in the fourth level. As described above, the differences in times for reset can be attributed to many issues, including longer paths between connection points. The difference in times can be observed wherein the difference time times can be problematic. Moreover, in some instances, as shown in the $4^{th}$ waveform, which is close to the clock in the $5^{th}$ waveform, there are instances where a flip-flop arrangement reset may be accomplished in one clock cycle, while another flip-flop arrangement reset may be accomplished in a second clock cycle. The result of this occurrence is that the flip-flops get reset on different clock cycles and unpredictable values may result because of the different resets.

Conventional systems provide for a reset capability within one clock cycle, however these attempts come at a significant cost. The reset capability provides multitudes of connections between different flip-flop architectures with many buffers installed along different paths of the reset tree. The multitude of buffers are created to enable the reset to be roughly synchronous slowing up portions of signals from certain areas so the overall reset can be achieved in a single clock cycle.

Figure 3:
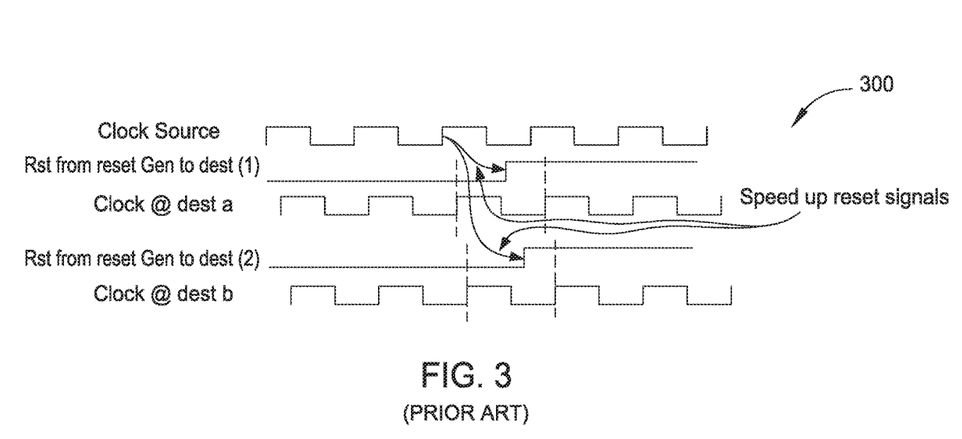
FIG. 3 is a diagram of a conventional reset de-assertion that reaches a destination 1 and destination 2 faster that ensures reset de-assertion in a single clock cycle.

In a conventional system, as provided in FIG. 3, signals 300 that are used for reset can be accelerated, thereby causing the signals in some "slow" areas to reach their respective flip-flop arrangements within a single clock signal.

Figure 4:
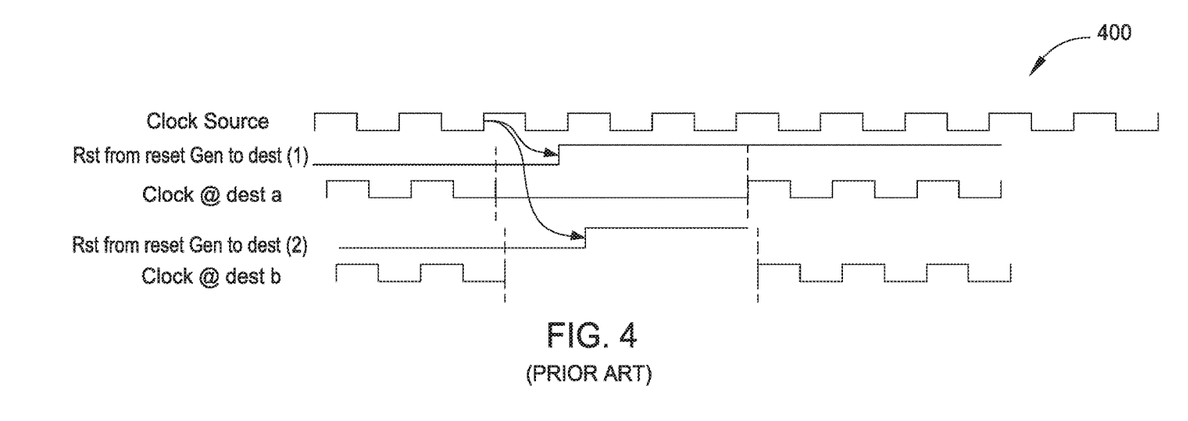
FIG. 4 is a diagram of conventional clocks stopped to ensure de-assertion is within a single pseudo long clock cycle.

In other conventional systems, as provided in FIG. 4, clocks 400 may be stopped to the destination flip-flop arrangements and then the clocks can be restarted. In an example embodiment, the stopping of clocks 400 then deasserting a reset and then starting of the clocks 400 may be done by software or firmware with multiple instructions.

Such types of conventional systems are costly as firmware code must be added for such controls. Complexity, for example the complexity of the software/firmware, is also increased for such a configuration.

Building buffers for each reset function or building a buffer for a set of reset functions can be quite problematic for chip designers. Chip designers are often limited to specific form factors and deviation from these form factors is generally not allowed. The overall number of flip-flop designs can necessitate a large number of buffers placed on a chip. These buffers can account for a significant area in the plan of the chip, limiting other devices that can be placed on the chip.

It is desired to provide a method and system to provide of system resets to allow for multiple components to be reset at one time without causing system operational issues that happen with conventional systems.

There is also a need to provide a system and method for system resets that is not complicated and that can be used on differing types of systems.

SUMMARY OF THE DISCLOSURE

So that the manner in which the above recited features of the present disclosure can be understood in detail, a more particular description of the disclosure, briefly summarized below, may be had by reference to embodiments, some of which are illustrated in the appended drawings. It is to be noted that the appended drawings illustrate only typical embodiments of this disclosure and are therefore not to be considered limiting of its scope, for the disclosure may admit to other equally effective embodiments without specific recitation. Accordingly, the following summary provides just a few aspects of the description and should not be used to limit the described embodiments to a single concept.

In one non-limiting embodiment, a method to perform operations of an electrical device is disclosed having steps of performing operations based upon a clock signal, asserting a reset of operations, stopping the clock through a reset generation block for a number N cycles and performing the reset of operations during the stopping of the clock through the reset generation block for the number N cycles.

In another non-limiting embodiment, a method to perform operations of an electrical device is disclosed having steps of performing operations based upon a clock signal, asserting a reset of operations for a given selection of flip-flop arrangements, stopping the clock through a reset generation block for a number N cycles and performing the reset of operations of the given selection of flip-flop arrangements during the stopping of the clock through the reset generation block for the number N cycles.

In another non-limiting embodiment, an arrangement is configured to perform a method of operations of an electrical device, having means for performing operations based upon a clock signal, means for asserting a reset of operations, means for stopping the clock through a reset generation block for a number N cycles and means for performing the reset of operations during the stopping of the clock through the reset generation block for the number N cycles.

In another non-limiting embodiment, a method is provided to perform operations of an electrical device, comprising performing operations for the electrical device, the electrical device having a clock generating a clock signal, asserting a reset of operations for the electrical device, wherein the asserting is one of user initiated and software initiated, stopping the clock through a reset generation block for a first number of cycles, restarting the clock after a second number of cycles and performing the reset of operations during the stopping of the clock through the restarting of the clock after the second number of cycles.

In another non-limiting embodiment, an arrangement to perform operations of an electrical device, is disclosed having means for asserting a reset of operations for the electrical device, wherein the asserting is one of user initiated and software initiated, means for stopping the clock through a reset generation block for a first number of cycles, means for restarting the clock after a second number of cycles and means for performing the reset of operations during the stopping of the clock through the restarting of the clock after the second number of cycles.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Some embodiments will now be described with reference to the figures. Like elements in the various figures will be referenced with like numbers for consistency. In the following description, numerous details are set forth to provide an understanding of various embodiments and/or features. It will be understood, however, by those skilled in the art that some embodiments may be practiced without many of these details and that numerous variations or modifications from the described embodiments are possible. As used herein, the terms "above" and "below", "up" and "down", "upper" and "lower", "upwardly" and "downwardly", and other like terms indicating relative positions above or below a given point or element are used in this description to more clearly describe certain embodiments.

Aspects of the present disclosure relate to computer operations and computer storage. In the embodiments described, a data storage arrangement is connected to a host system. The function of the data storage arrangement is to accept data and store the data until needed again by a user or the host. The data storage arrangement, such as a solid state drive, may be configured to accept bursts of data, depending on the computer process performed, therefore the data storage arrangement is configured with multiple memory units that provide for various states of usage. Certain sections of the data storage arrangement are configured of memory systems that provide for fast action (low latency) so that computer processes may be conducted at a rapid pace. Such low latency performance may be accomplished by single layer cell (SLC) memory configurations. If bulk amounts of data are required to be stored, multiple layer cell memory configurations may also be present, such as triple level cell (TLC) memory configurations. The data storage arrangement may have an interface that allows the data storage arrangement to connect with the host. The interface may be a SAS Interface or Serial ATA (SATA) compatible interface, as a non-limiting embodiments. The memory storage may have a configuration to allow for plug and play ability. Although described as having a SATA compatible interface, the memory storage device may be provided with a configuration which allows for access by wireless technology. In one non-limiting embodiment, 802.11ac technology may be used to provide for fast performance for smooth streaming. Wireless technology may use, for example, between 2.5 GHz to 5 GHz frequencies for connection. In some embodiments, the storage may allow users to choose the frequencies for wireless connection. While being described as SATA compatible, other types of interfaces may be used.

Auxiliary connections may be provided to the data storage arrangement to allow for additional options for inputting data directly to the data storage arrangement without interfacing with the host. Such direct input of data may be provided through placement of an integrated secure digital card to offload or copy data. Other auxiliary connections may be provided for additional input/output operations. Such connections may be USB 2.0, USB 3.0, Firewire or other hard wired configurations. Gigabit Ethernet interfaces and connections may also be used.

The data storage arrangement may be configured with a separate power supply or may be run through other power supply means, such as from a computer mother board. In some embodiments, an internal battery may be provided to power the data storage arrangement as an independent entity. Such configurations may be provided such that the data storage arrangement is a portable unit. In such data storage arrangement configurations, the power supply means may be sufficient to power a host and/or charge a host, such as a mobile cellular phone, personal computer, tablet, camera or other configuration. The data storage arrangement may also have a battery indicator to allow a user to understand the amount of charge in the data storage arrangement from a visual inspection. Such battery indicators may be, for example, low energy consumption light emitting diode technology. In specific embodiments, the data storage arrangement may be provided with a circuit to allow for charging and prevent overcharging of the system if the data storage arrangement is connected to an outside power supply for an extended period. In some embodiments, circuitry may be used to determine if a threshold of inactivity has been reached for the storage system, thereby causing the system to enter a low power consumption mode, conserving battery power.

In one non-limiting embodiment, a controller is provided to control actions of the data storage arrangement as required by the host. The controller may also be configured to perform maintenance activities for the data storage arrangement to allow for efficient use.

Internal software may be provided on the data storage arrangement to allow for efficient storage and read capability of data on the system. Such internal software may be used such that the data storage arrangement can be used as a portable media server to wirelessly stream media to a host or output device. Such output devices may include, but not be limited to, smart televisions, smart phones, stereo audio system. The internal software may also be provided such that the access of data may be performed by cloud applications designed for interface with the data storage arrangement.

The internal software of the data storage arrangement may also be configured to provide for security of the data storage arrangement. Safeguarding of material provided on the data storage arrangement prevents unauthorized access to sensitive information contained on the system. Such security may be in the form of password protection, such as a Wi-Fi password protection. In some embodiments, the data storage arrangement may be configured with software that allows the data storage arrangement to create a hardware lock. Such hardware locks may prevent access through a USB connection.

The internal software may also be capable of providing diagnostic support for users. In such configurations, two different modes may be provided. A quick test software program may be provided with the capability to check the data storage arrangement for major performance problems. A full test mode may also be provided to provide detailed status information to a user. Such status information may be, for example, total amount of memory of the data storage arrangement, the amount of memory storage used, storage divisions provided on the data storage arrangement, firmware versions for the internal software, memory block errors and similar data. The internal software may also have the capability of accepting data to update the firmware of the internal software.

The internal software may also be used as a server system wherein in certain embodiments, Digital Living Network Alliance (DLNA) enabled software is incorporated. Such software allows for quick file transfer and error checked operation as a server. In some embodiments, the internal software may be provided with the capability to use file transfer protocol (FTP) to enable the transfer of content to and from the memory storage in public access folders. The data storage arrangement may also provide for either a secured log in or an anonymous login capability.

In specific embodiments, the data storage arrangement may be configured such that the system interacts with cloud storage systems. In the event that the data storage arrangement approaches the limits of storage capability, the data storage arrangement may allow for some of the data to be stored on cloud based systems. Selection of the data to be stored on such external storage systems may be governed by the controller which is configured to determine what sections of data may be appropriately stored in cloud based systems to minimize latency for users. The storage system may have a unique identifier MAC address and device name to allow the system to operate on an independent basis. The storage system may also be operated in a configuration that allows for the system to clone a MAC address of a computer that is attached.

The overall capacity of the data storage arrangement may vary according to the different embodiments provided. Capacities 1 TB, 2 TB up to 64 TB may be provided, as non-limiting embodiments. Different form factors may also be provided. In the illustrated embodiment, a form factor of 2.5 inches is provided. Other form factors such as 1.8 inch or 3.5 inch may also be used. Compatibility of the data storage arrangement may be provided for Windows operating systems, Windows Server, Linux and Mac OS, as non-limiting embodiments. Example Windows operating systems that may use the system may be Windows 10, Windows 8 and Windows 7. Example Mac OS systems may be Lion (Mac OSA 10.7), Mountain Lion (Mac OS 10.8), Yosemite (Mac OS 10.10), El Capitan (Mac OS 10.11), Sierra and Mavericks as non-limiting embodiments. Supported browsers for the storage system may be, in non-limiting embodiments, Internet Explorer, Safari, Firefox and Google Chrome.

Software may also be included in the system to allow for quick and automatic backups of data according to user prescribed requirements. Such backup ability may be compliant with Windows based backup and restore functions and/or Apple Time Machine requirements. Furthermore, software may be provided to add more than one user to the storage system. Users can be added or deleted according to an administration account. Such administration account may also allow for restricted access for certain users according to administration requirements.

In aspects provided, a user or host may provide an input to a computing arrangement and consequently, the memory arrangement. The memory arrangement, and an associated controller, may accept this data and act according to the data received. For clarity, a device, as described herein, is a memory arrangement that may accept, store and retrieve data, such as, for example, a solid state drive. The input may contain information that is placed on mode page format. In one non-limiting embodiment, the data may be a performance profile that the device should match in a workload performance profile mode page. Advantages of such actions would allow a user the ability to take drives from different manufacturing origins and allow the drives to operate at a similar level, despite having different manufacturing tolerances and capabilities.

The present arrangements and methods presented herein provide for relaxed reset recovery times for electronic components. In the illustrated embodiments, the electronic components may be, for example, a disk drive apparatus, computer, phone, portable music device. During operations for electrical apparatus, electrical components may need to be stop and restarted. Such actions are the result of operations that come from a user or from a software request.

In an effort to provide for stability and continuity of use, electrical components that are needed for operation may start operations with a given configuration of components that are "off" or "on" according to a desired system configuration from a system architect. Generally, electronic elements that constitute the electronic components are either of these two defined states. To ensure that the all of the electronic elements are placed into a desired configuration, a reset command may be accepted by the individual elements and the elements may react to the reset command by actuating to a preferred "default" configuration. A reset command is defined as placing a set of flip flops in a preconfigured alignment so a computer, for example, may start from a recognizable configuration. A reset may be, thus, software driven, hardware driven or user driven as non-limiting embodiments.

Clock signals may be used to time certain features of the methods described. A clock may create evenly spaced and regularly timed signals so that apparatus in the arrangements described can effectively time functions to be performed. The clock may be part of a host, such as a host computer, that that is connected, for example, to a solid state drive. In alternative embodiments, the clock may be "on board" the solid state drive itself. A processor, either specialized or not, may be used to create the clock signals. The processor may be connected to a power supply that provides energy to the processor for performing processing functions as well as generation of the clock signals. In other embodiments, the clock signals may be generated or maintained, for example, in a controller that controls functions of apparatus connected.

Clock signals may be propagated from the processor that produces such signals to other components through either direct connection with the processor or through a bus arrangement. In the embodiments that provide a bus arrangement, the bus may be configured to allow a one way data passage or may allow a two direction data passage. In embodiments having a two direction data passage, the data may be synchronized so that signals are clearly transmitted across the bus without distortion or interference.

In embodiments provided, a boot up process may be used to allow for data reading and undertaking specific actions prior to being made available for use by a user. The boot up process may provide such data to be read from a NOR arrangement that allows for non-volatile storage of such data. Updates of the boot process, such as data and processes for firmware updates, may be provided and stored in the NOR arrangement for loading. All such updates to the NOR arrangement may be made is a power safe type update to minimize corruption of data.

One of the prime components in a reset is the central processing unit ("CPU") of the system. Upon an initiation of a reset, the CPU will retrieve a first instruction that will be located in a default location. This default location is commonly known as a reset vector and is usually placed in a memory. Such memory is a non-volatile memory such that loss of power will not affect the ability of the computer to restart. Such a non-volatile memory may be in a NOR arrangement or a NAND arrangement in differing embodiments.

A power on self-test ("POST") may then be performed to check the hardware of the systems and report back any abnormalities that are encountered. Such POST routines, may be executed during a pre-boot sequence of a computer, and if such POST routines are successful, then a bootstrap loader code may be used to load an operating system for continued operation. POST routines may be run by either software, hardware, or as is commonly done, a combination of hardware and software.

Timing the needed actions of the individual electrical elements to a reset is an important task that must be planned for by system architects. For conventional systems, individual wires or other arrangements must be added to the systems to allow for operational capabilities. These individual wires or other arrangements are generally costly and complicated in design. These complicated designs can lead to errors in the associated systems if the architectures encounter a defect. To combat these types of errors, embodiments provided herein allow the systems that incorporate the methods and arrangements to perform reset commands over a larger time frame format, thereby allowing the computer architecture to be more resilient to errors. In computers, distribution of signals between electrical components can encompass over thirty (30) percent of the surface area of a microprocessor. The distribution of the signals is performed by what is called a "clock tree" to components that need synchronization. The clock tree is connected to one of a one phase clock, a two phase clock or a four phase clock as non-limiting examples that provide a periodic signal oscillating from a low value to a high value. Deviations from the periodic signal oscillating from the low value to the high value is defined as "jitter" and the connected electrical components take jitter into account as a perfect periodic oscillation cannot be guaranteed.

Figure 5:
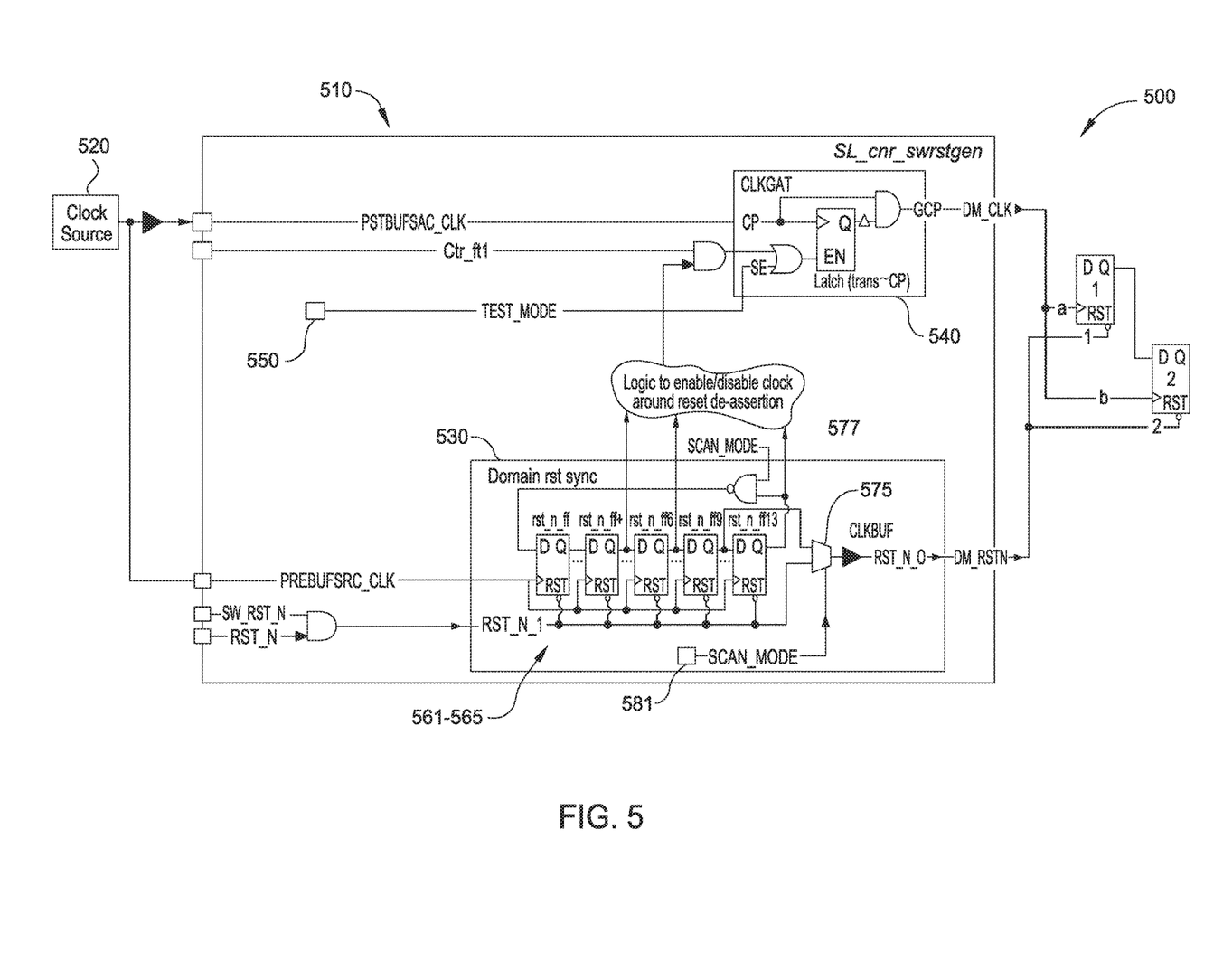
FIG. 5 is a diagram of a reset and clock generation block combined to detect a software reset and stop a clock source in accordance with one example embodiment disclosed.

Referring to FIG. 5, a configuration for allowing relaxation of reset recovery and removal of timing paths for resets at fast clock speeds is provided. In the illustrated embodiment, a configuration 500 is provided to detect software resets. In the illustrated configuration 500 a reset and clock generation block 510 is provided. The reset and clock generation block 510 is connected to a final clock source 520, such as a system clock for a computer. The reset and clock generation block 510 is operatively connected to the final clock source 520.

The reset and clock generation block 510 is configured with a domain reset synchronization arrangement 530 and a clock gate arrangement 540. A test mode connection 550 is provided such that testing of the reset and clock generation block 510 and the domain reset synchronization arrangement 530. The test mode connection 550 may be provided such that auxiliary testing equipment or alternative components, such as testing chips, may be added.

The domain reset synchronization arrangement 530 is provided as an example arrangement and deviations from this arrangement 530 may be provided. Five flip-flop arrangements 561-565 are provided. The five flip-flop arrangements 561-565 are D flip-flop arrangements (also known as a delay flip-flop arrangement). Such D flip-flop arrangements allow for capture of a portion of a clock cycle. Reset connections for the five flip-flop arrangements 561-565 are connected in line together and provided to a multiplexer 575 for processing. Scanning of information being processed within the multiplexer 575 is provided through a scan mode input 581. The scan mode input 581 may be addressable directly by a user by connecting auxiliary equipment (not shown) or may be connected in a more permanent fashion to a scanning module present, for example, in a host computer. The output Q of each of the flip-flop arrangements 561-565 is connected to an input of a flip-flop arrangement, the multiplexer 575 or an "AND" gate 577. The configuration provided above allows the final clock to be stopped for a number of N cycles. The configuration may then be started again after M cycles, wherein both N and M are integers greater than 0. It should be understood that in conformance with different embodiments, the creation of a long time period or system clock pulse can be the addition of the N and M cycles or may be performed on only the number of N cycles. The values N and M may also be integers for calculation purposes.

The arrangement illustrated in FIG. 5 provides a configuration with relatively low cost electronic components that will allow for the stopping of the final clock for the integer N and M values. The illustrated embodiment provides for a number of stopping for N cycles=2 and restarting after M=3 cycles. By adding or subtracting the number of flip-flops 565, the number of N and M cycles may be adjusted.

As will be obvious to those skilled in the art, other configurations may be used to those discussed in FIG. 5, therefore the configurations presented are only one example embodiment. Variables such as N and M may be chosen by a processor or may be user defined, to allow for choice.

Figure 6:
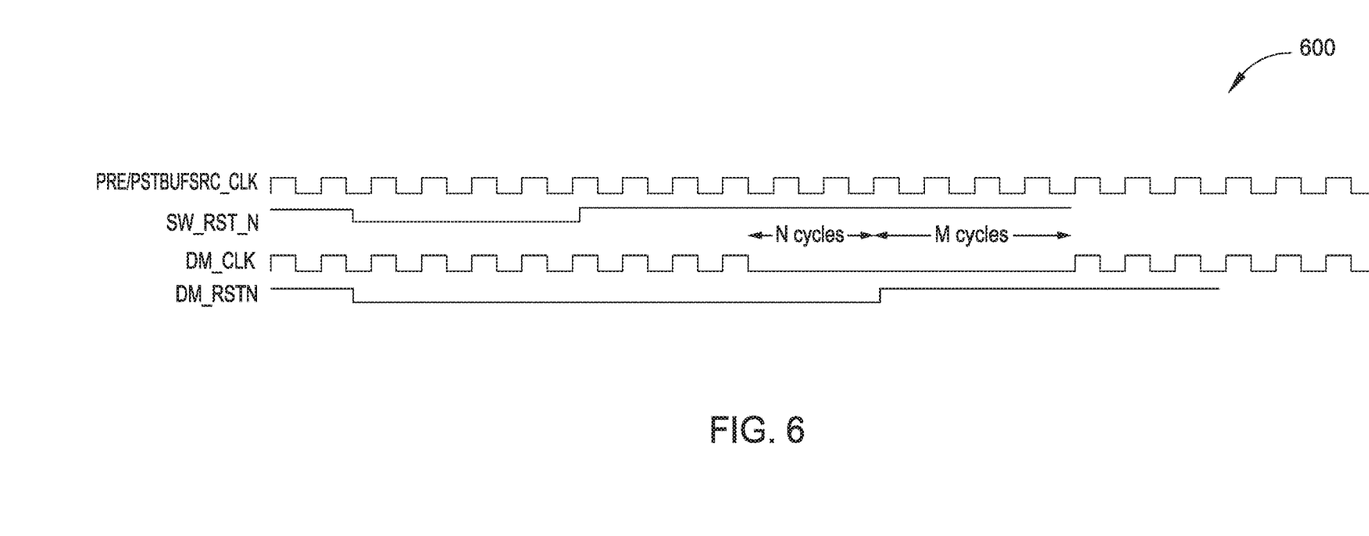
FIG. 6 is a diagram of clock times that are stopped by hardware to ensure de-assertion is within a single clock cycle.

Referring to FIG. 6 is a graph 600 of clocks that are stopped by the arrangement provide in FIG. 5. As provided in the DM CLK middle time graph interval, the system clock may be stopped for N cycles and restarted after an additional M cycles. Time frames for the stoppage and restarting are provided in the PRE/PSTBUFSRC_CLK. A timeline for the initiation of a reset (either by a user or a software) is provided in the SW_RST_N graph. The domain reset timeline at the bottom of the graph, shows that there reset occurs at the start of the M cycles, as expected.

Through the above configuration provided in FIG. 5, the clock gate arrangement 540 may be stopped for a defined amount of time to allow all of the reset configurations to be effectively completed. As computer operating systems become faster and the need for performing reset conditions is challenged, the above configuration allows for reset capabilities without needing excessive software and expensive buffers placed in operation. This provides significant advantages over conventional systems that require extensive system trees and system complexity. Electronics that use these embodiments can therefore be produced more economically. Operations, moreover, are less prone to fault as the number of components involved is less. Such arrangements provide significant advantages over conventional systems that require large footprints of processor space and multitudes of connections, provided by a reset tree, for operability.

Figure 7:
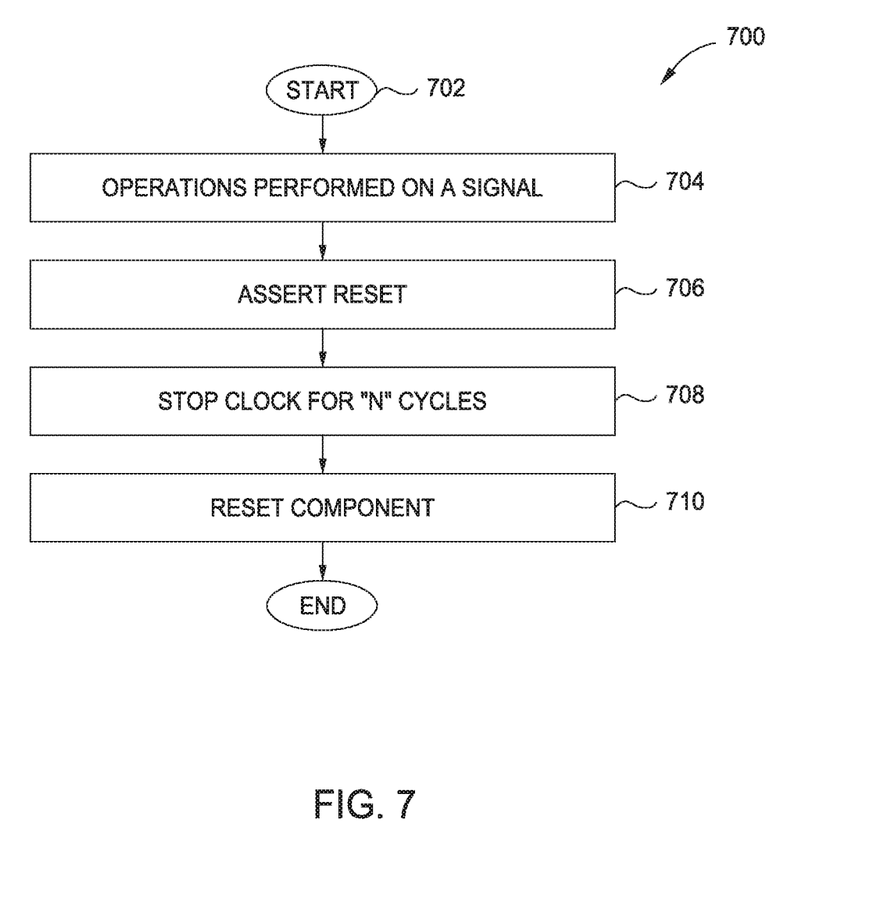
FIG. 7 is a first method for performing a reset according to one example embodiment of the disclosure.

Referring to FIG. 7, a method 700 to perform operations of an electrical device is illustrated. The method starts at 702. The method proceeds to 704 where operations of the electrical device are performed based upon a signal. This signal may be a clock signal, for example. The method proceeds to 706 where a reset of operations is asserted. The assertion may be at the direction of a user, software, firmware or hardware. The method proceeds to 708 wherein the clock is stopped for a number of cycles. The number of cycles for stopping the clock may be defined as N, wherein N is an integer. A reset of operations may be performed during the stopping of the clock at 710. The reset may occur through a reset generation block, as a non-limiting embodiment.

Figure 8:
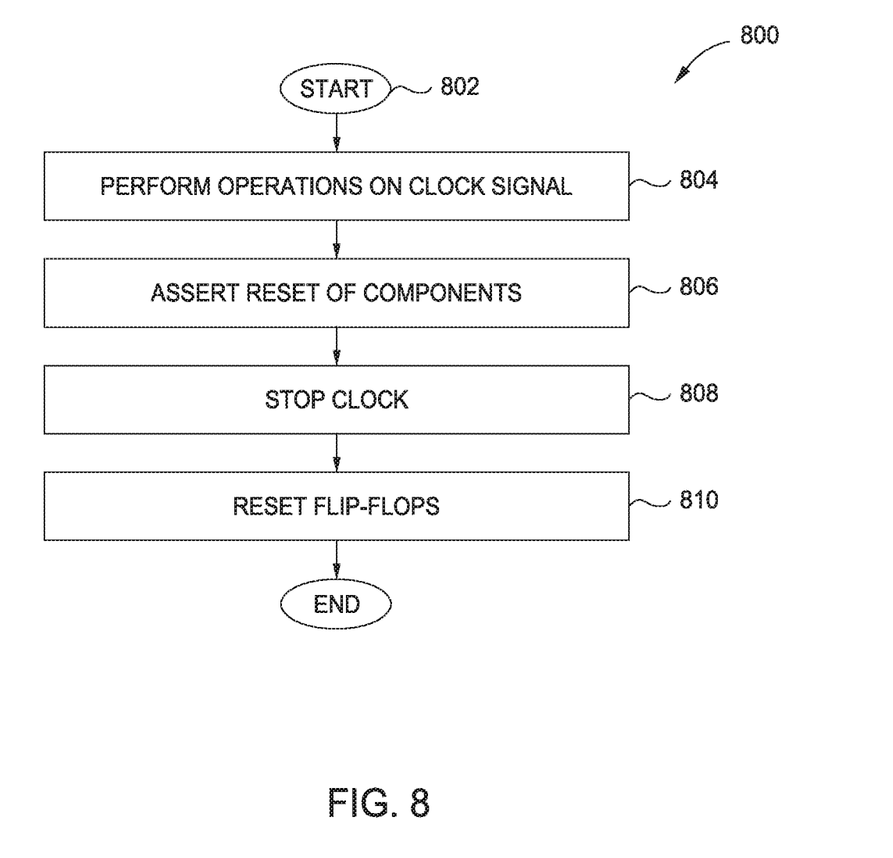
FIG. 8 is a second method for performing a reset according to one example embodiment of the disclosure.

Referring to FIG. 8, another example embodiment of a method 800 to perform operations of an electrical device is disclosed. The method starts at 802. The method continues to 804 wherein operations are performed based upon a clock signal. Such operations may be computer operations, such as solid state drive write and read operations. The method continues to 806 wherein a reset components performing operations for a given selection of flip-flop arrangements is asserted. The assertion may be ordered by a user, software or firmware as non-limiting embodiments. The method continues to 808 wherein the clock is stopped through a reset generation block. The amount of time that the clock is stopped may be based upon a number, N, of cycles. The value of N may be any integer value greater than 0. At 810, a reset of the components performing operations may be performed for the flip-flop arrangements during the stopping of the clock through the reset generation block.

Figure 9:
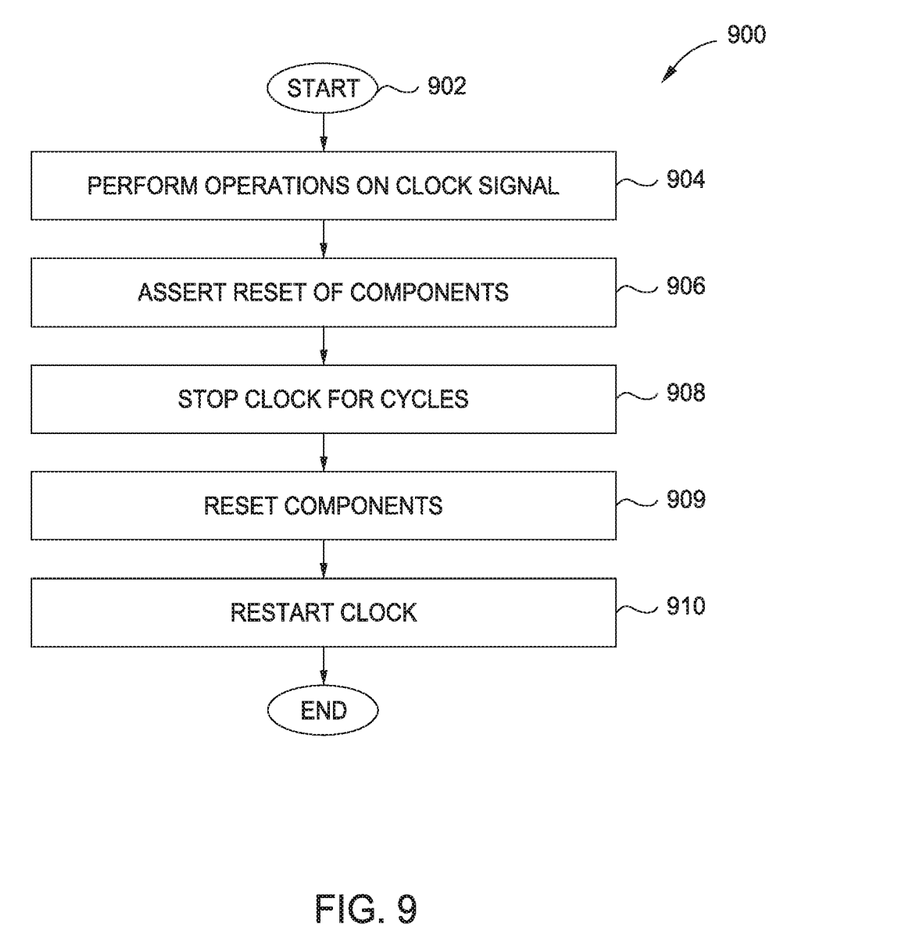
FIG. 9 is a third method for performing a reset according to one example embodiment of the disclosure.

Referring to FIG. 9, another non-limiting embodiment for a method 900 of performing operations of an electrical device, such as a solid state drive, is illustrated. The method 900 starts at 902. At 904, the method entails performing operations for the electrical device, wherein a clock is generating a clock signal during the performance of the operations. At 906, a reset of components performing operations for the electrical device is asserted wherein the asserting is one of user initiated and software initiated. At 908, the clock is stopped through a reset generation block for a first number of cycles. At 910, the clock is restarted after a second number of cycles. At 909, a reset of operations is performed during the stopping of the clock through the restarting of the clock after the second number of cycles.

Aspects of the disclosure allow for a method and apparatus that provides for accurate reset conditions that cannot occur within a single clock cycle. Such methods and apparatus allow for more secure and less error prone operations for electrical apparatus, such as a solid state drive. The extension of time for allowing for flip-flop arrangements to correctly reset, under a specific order, allows for superior operations compared to conventional systems.

According to the above, in one non-limiting embodiment, a method to perform operations of an electrical device is described comprising performing operations based upon a clock signal, asserting a reset of operations, stopping the clock through a reset generation block for a number N cycles and performing the reset of operations during the stopping of the clock through the reset generation block for the number N cycles.

In another non-limiting embodiment, the method may be accomplished wherein the reset is a computer reset.

In another non-limiting embodiment, the method may be accomplished wherein the asserting the reset operations is one of user controlled and computer controlled.

In another non-limiting embodiment, the method may further comprise resuming computer operations after the performing of the reset operations.

In another non-limiting embodiment, the method may be performed wherein the number N is chosen as a longest time period for reset of all flip-flop arrangements in a system.

In another non-limiting embodiment, the method may be performed wherein the asserting the reset of operations is through a software reset.

In another non-limiting embodiment, the method may further comprise detecting the asserting of the reset of operations through a hardware configuration.

In another non-limiting embodiment, the method may be performed wherein the hardware configuration is a reset generation block.

In another non-limiting embodiment, a method to perform operations of an electrical device is described comprising performing operations based upon a clock signal, asserting a reset of operations for a given selection of flip-flop arrangements, stopping the clock through a reset generation block for a number N cycles and performing the reset of operations of the given selection of flip-flop arrangements during the stopping of the clock through the reset generation block for the number N cycles.

In another non-limiting embodiment, the method may further comprise resuming computer operations after the performing of the reset operations.

In another non-limiting embodiment, the method may be performed wherein the asserting the reset of operations is through a software reset.

In another non-limiting embodiment, the method may further comprise detecting the asserting of the reset of operations through a hardware configuration.

In another non-limiting embodiment, the method may be performed wherein the stopping of the clock is for a period longer than a single clock cycle.

In another non-limiting embodiment, an arrangement configured to perform a method of operations of an electrical device, is disclosed comprising means for performing operations based upon a clock signal, means for asserting a reset of operations, means for stopping the clock through a reset generation block for a number N cycles and means for performing the reset of operations during the stopping of the clock through the reset generation block for the number N cycles.

In another non-limiting embodiment, the arrangement may further comprise means for detecting the reset of operations.

In another non-limiting embodiment, the arrangement may further comprise means for providing a logic to prove for a synchronization of arrangement after the reset.

In another non-limiting embodiment, the arrangement may further comprise means for conducting a test of the means for asserting a reset of operations.

In another non-limiting embodiment, a method to perform operations of an electrical device is described comprising performing operations for the electrical device, the electrical device having a clock generating a clock signal, asserting a reset of operations for the electrical device, wherein the asserting is one of user initiated and software initiated, stopping the clock through a reset generation block for a first number of cycles, restarting the clock after a second number of cycles, and performing the reset of operations during the stopping of the clock through the restarting of the clock after the second number of cycles.

In another non-limiting embodiment, the method may be performed wherein the performing the reset of operations is performed through a signal received by a reset generation block.

In another non-limiting embodiment, an arrangement to perform operations of an electrical device is described having means for asserting a reset of operations for the electrical device, wherein the asserting is one of user initiated and software initiated, means for stopping the clock through a reset generation block for a first number of cycles, means for restarting the clock after a second number of cycles and means for performing the reset of operations during the stopping of the clock through the restarting of the clock after the second number of cycles.

While embodiments have been described herein, those skilled in the art, having benefit of this disclosure will appreciate that other embodiments are envisioned that do not depart from the inventive scope of the present application. Accordingly, the scope of the present claims or any subsequent related claims shall not be unduly limited by the description of the embodiments described herein.

What is claimed is:

1. A method to perform operations of an electrical device, comprising:
   performing operations during operation of a clock producing a clock signal;
   asserting a reset of components performing operations for the electrical device;
   after the reset of components is asserted, stopping the clock through a reset generation block for a number N cycles; and
   performing the reset of components performing operations during the stopping of the clock through the reset generation block for the number N cycles.

2. The method according to claim 1, wherein the reset is a computer reset.

3. The method according to claim 1, wherein the asserting the reset of components performing operations for the electrical device is one of user controlled and computer controlled.

4. The method according to claim 1, further comprising:
   resuming computer operations after the performing of the reset of components performing operations.

5. A method to perform operations of an electrical device, comprising:
   performing operations during operation of a clock producing a clock signal;
   asserting a reset of components performing operations for the electrical device;
   stopping the clock through a reset generation block for a number N cycles; and
   performing the reset of components performing operations during the stopping of the clock through the reset generation block for the number N cycles, wherein N is chosen as a longest time period for reset of all flip-flop arrangements in a system.

6. A method to perform operations of an electrical device, comprising:
   performing operations during operation of a clock producing a clock signal;
   asserting a reset of components performing operations for the electrical device;
   stopping the clock through a reset generation block for a number N cycles; and performing the reset of components performing operations during the stopping of the clock through the reset generation block for the number N cycles, wherein the asserting the reset of components performing operations is through a software reset.

7. The method according to claim 1, further comprising:
detecting the asserting of the reset of components performing operations through a hardware configuration.

8. The method according to claim 7, wherein the hardware configuration is a reset generation block.

9. The method according to claim 1, wherein the asserting the reset of components performing operations is through a hardware reset.

10. A method to perform operations of an electrical device, comprising:
performing operations based upon a clock signal;
asserting a reset of components performing operations for a given selection of flip-flop arrangements;
after the reset of components is asserted, stopping the clock through a reset generation block for a number N cycles; and
performing the reset of components performing the operations of the given selection of flip-flop arrangements during the stopping of the clock through the reset generation block for the number N cycles.

11. The method according to claim 10, wherein the reset is a computer reset.

12. A method to perform operations of an electrical device, comprising:
performing operations based upon a clock signal;
asserting a reset of components performing operations for a given selection of flip-flop arrangements;
stopping the clock through a reset generation block for a number N cycles; and performing the reset of components performing the operations of the given selection of flip-flop arrangements during the stopping of the clock through the reset generation block for the number N cycles, wherein the asserting the reset of components performing operations is user controlled.

13. The method according to claim 10, further comprising:
resuming computer operations after the performing of the reset of components performing operations.

14. A method to perform operations of an electrical device, comprising:
performing operations based upon a clock signal;
asserting a reset of components performing operations for a given selection of flip-flop arrangements;
stopping the clock through a reset generation block for a number N cycles; and performing the reset of components performing the operations of the given selection of flip-flop arrangements during the stopping of the clock through the reset generation block for the number N cycles, wherein the asserting the reset of components performing operations is through a software reset.

15. The method according to claim 10, further comprising:
detecting the asserting of the reset of components performing operations through a hardware configuration.

16. The method according to claim 10, wherein the stopping of the clock is for a period longer than a single clock cycle.

17. The method according to claim 10, wherein the asserting the reset of components performing operations is through a hardware reset.

18. A method to perform operations of an electrical device, comprising:
performing operations based upon a clock signal;
asserting a reset of components performing operations for a given selection of flip-flop arrangements;
stopping the clock through a reset generation block for a number N cycles; and performing the reset of components performing the operations of the given selection of flip-flop arrangements during the stopping of the clock through the reset generation block for the number N cycles, wherein the asserting the reset of components performing operations is through a user defined reset.

19. The method according to claim 10, wherein the reset is computer controlled.

20. A method to perform operations of an electrical device, comprising:
performing operations based upon a clock signal;
asserting a reset of components performing operations for a given selection of flip-flop arrangements;
stopping the clock through a reset generation block for a number N cycles; and performing the reset of components performing the operations of the given selection of flip-flop arrangements during the stopping of the clock through the reset generation block for the number N cycles, wherein the performing the reset of components performing the operations of the given selection of flip-flop arrangements during the stopping of the clock through the reset generation block for the number N cycles entails changing at least one flip-flop arrangement configuration.

21. The method according to claim 20, wherein the changing the at least one flip-flop arrangement configuration is to a pre-set configuration.

22. An arrangement configured to perform a method of operations of an electrical device, comprising:
means for performing operations based upon a clock signal;
means for asserting a reset of components performing operations;
means for stopping the clock through a reset generation block for a number N cycles after the reset of components is asserted; and
means for performing the reset of components performing operations during stopping the clock through the reset generation block for the number N cycles.

23. The arrangement according to claim 22, further comprising:
means for detecting the reset of operations.

24. The arrangement according to claim 22, further comprising:
means for providing a logic to prove for a synchronization of arrangement after the reset.

25. An arrangement configured to perform a method of operations of an electrical device, comprising:
means for performing operations based upon a clock signal;
means for asserting a reset of components performing operations;
means for stopping the clock through a reset generation block for a number N cycles; and
means for performing the reset of components performing operations during stopping the clock through the reset generation block for the number N cycles; and
means for conducting a test of the means for asserting a reset of components performing operations.

26. A method to perform operations of an electrical device, comprising:
performing operations for the electrical device, the electrical device having a clock generating a clock signal;

asserting a reset of components performing operations for the electrical device, wherein the asserting is one of user initiated and software initiated;

after the reset of components is asserted, stopping the clock through a reset generation block for a first number of cycles;

restarting the clock after a second number of cycles; and performing the reset of components performing the operations during the stopping of the clock through the restarting of the clock after the second number of cycles.

27. The method according to claim 26, wherein the performing the reset of components performing operations is performed through a signal received by a reset generation block.

28. The method according to claim 27, wherein the reset of the components is to a predefined configuration.

29. An arrangement to perform operations of an electrical device, comprising:

means for asserting a reset of operations for the electrical device, wherein the asserting is one of user initiated and software initiated;

means for stopping the clock through a reset generation block for a first number of cycles after the reset of operations is asserted;

means for restarting the clock after a second number of cycles; and means for performing the reset of operations during stopping the clock through restarting the clock after the second number of cycles.

* * * * *